US011712676B2

(12) United States Patent
Yang et al.

(10) Patent No.: US 11,712,676 B2
(45) Date of Patent: Aug. 1, 2023

(54) REACTION TOWER, PRODUCTION SYSTEM, AND PRODUCTION METHOD FOR PRODUCING POTASSIUM MANGANATE

(71) Applicant: Shenzhen Hangxin Trading Co., Ltd., Guangdong (CN)

(72) Inventors: Guan Yang, Guangdong (CN); Liangqin Lin, Guangdong (CN); Junliang Zhao, Guangdong (CN)

(73) Assignee: SHENZHEN HANGXIN TRADING CO., LTD., Shenzhen (CN)

( * ) Notice: Subject to any disclaimer, the term of this patent is extended or adjusted under 35 U.S.C. 154(b) by 426 days.

(21) Appl. No.: 17/108,654

(22) Filed: Dec. 1, 2020

(65) Prior Publication Data

US 2021/0197160 A1 Jul. 1, 2021

(30) Foreign Application Priority Data

Dec. 26, 2019 (CN) ......................... 201911387744.2

(51) Int. Cl.

| | |
|---|---|
| ***B01J 8/22*** | (2006.01) |
| ***B01J 8/18*** | (2006.01) |
| ***C01G 45/12*** | (2006.01) |

(52) U.S. Cl.

CPC ............... *B01J 8/22* (2013.01); *B01J 8/1872* (2013.01); *C01G 45/1214* (2013.01); *B01J 2208/00911* (2013.01)

(58) Field of Classification Search

CPC .. B01J 8/22; B01J 8/1872; B01J 2208/00911; B01J 2208/0092; B01J 8/1827; B01J 8/1854; B01J 8/226; B01J 19/2455; B01J 19/246; C01G 45/1214; C01G 45/12

USPC .......................................................... 423/599

See application file for complete search history.

(56) References Cited

FOREIGN PATENT DOCUMENTS

| | | | | |
|---|---|---|---|---|
| CN | 101746830 A | * | 6/2010 | ............. C01G 45/12 |
| CN | 106745292 A | * | 5/2017 | ............. C01G 45/12 |
| KR | 100999543 B1 | * | 12/2010 | ................ C08F 2/34 |

* cited by examiner

*Primary Examiner* — Huy Tram Nguyen

(74) *Attorney, Agent, or Firm* — David A. Jones; Nadesan Beck P.C.

(57) ABSTRACT

Disclosed are a reaction tower, a production system, and a production method for producing potassium manganate. The reaction tower includes a reaction tower body and a bubble generator. The reaction tower body has a reaction chamber. The bubble generator includes an outer housing. The outer housing is disposed in the reaction chamber and has a gas flow channel therein. The outer housing is configured to direct an external reactant gas into the gas flow channel. The outer housing is provided with multiple first pores each having a diameter less than 10 mm, via which the gas flow channel communicates with the reaction chamber. The reaction tower is used in the production system. The reactant gas is introduced into the reaction chamber in the form of small bubbles by the action of the bubble generator, to increase the area of contact of the reactant gas with manganese ore powder and lye.

20 Claims, 5 Drawing Sheets

REACTION TOWER, PRODUCTION SYSTEM, AND PRODUCTION METHOD FOR PRODUCING POTASSIUM MANGANATE

CROSS-REFERENCE TO RELATED APPLICATION

The present disclosure claims the priority to the Chinese patent application with the filing number 2019113877442, filed on Dec. 26, 2019 with the Chinese Patent Office, and entitled "Reaction Tower, Production System, and Production Method for Producing Potassium Manganate", the contents of which are incorporated herein by reference in entirety.

TECHNICAL FIELD

The present disclosure relates to the technical field of production of potassium manganate, and in particular to a reaction tower, a production system, and a production method for producing potassium manganate.

BACKGROUND ART

Currently, potassium manganate is mostly produced by a process such as a solid phase oxidation method (e.g., a roasting method using an open-hearth furnace and a pressure oxidation method using a rotary furnace), or a liquid phase oxidation method (e.g., a three-phase pressure oxidation method, and a method using a pneumatic fluidized tower). Among them, the liquid phase oxidation method refers to a process of reaction of a reactant gas, lye, and manganese ore powder (the gas-liquid-solid phases).

In the prior art, when potassium manganate is prepared by using the liquid phase oxidation method, manganese dioxide in the manganese ore powder exhibits a low percent conversion, and thus potassium manganate is produced at a relatively slow rate.

SUMMARY

In a first aspect, an embodiment of the present disclosure provides a reaction tower for producing potassium manganate, including a reaction tower body and a bubble generator. The reaction tower body has a reaction chamber therein. The bubble generator includes an outer housing. The outer housing is disposed in the reaction chamber. The outer housing has a gas flow channel therein. The outer housing is configured to direct an external reactant gas into the gas flow channel. The outer housing is provided with multiple first pores each having a diameter less than 10 mm. The gas flow channel communicates with the reaction chamber via the first pores.

In a second aspect, an embodiment of the present disclosure provides a system for producing potassium manganate, including a potassium manganate crystallization device, a potassium manganate separation device, and the reaction tower described above, wherein a drain outlet of the reaction tower body communicates with the potassium manganate crystallization device, and the potassium manganate separation device communicates with the potassium manganate crystallization device.

In a third aspect, an embodiment of the present disclosure provides a method for producing potassium manganate, which is applicable to the system for producing potassium manganate described above. The production method includes: introducing a reactant gas into the gas flow channel through the outer housing and into the reaction chamber of the reaction tower body through the first pores, so that the reactant gas is converted into small bubbles which are mixed and reacted with lye and manganese ore powder in the reaction chamber of the reaction tower body. The reacted materials are expelled from the drain outlet to the potassium manganate crystallization device for crystallization and then expelled to the potassium manganate separation device for separation.

BRIEF DESCRIPTION OF DRAWINGS

In order to more clearly illustrate technical solutions of embodiments of the present disclosure, drawings required for use in the embodiments will be described briefly below. It is to be understood that the drawings below are merely illustrative of some embodiments of the present disclosure, and therefore should not be considered as limiting its scope. It will be understood by those of ordinary skill in the art that other relevant drawings can also be obtained from these drawings without any inventive effort.

REFERENCE NUMERALS

Figure 1:
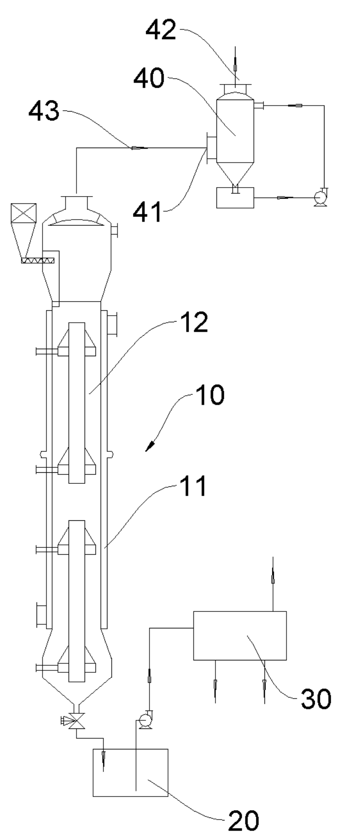
FIG. 1 is a schematic process structural view of a system for producing potassium manganate according to an embodiment of the present disclosure.

10—reaction tower; 20—potassium manganate crystallization device; 30—potassium manganate separation device; 40—residual gas purification device; 11—reaction tower body; 12—reaction chamber; 111—feeding section; 112—reaction section; 113—discharging section; 1111—residual gas outlet; 1112—gas cap; 1113—lye inlet; 1114—manganese ore powder inlet; 41—gas inlet; 42—gas outlet; 43—residual gas pipeline; 13—automatic screw feeder; 1121—hot air inlet; 1122—hot air outlet; 1123—first reactant gas inlet; 1131—drain outlet; 1132—second reactant gas inlet; 1133—three-way valve; 14—bubble generator; 141—outer housing; 142—gas flow channel; 143—first pore; 144—first cavity; 15—circulation pipe; 151—first circulation pipe; 152—second circulation pipe; 153—first channel; 121—second channel; 1411—first housing; 1412—first perforated plate; 1413—second pore; 1414—opening; 1415—upper plate; 1416—lower plate; 1417—annular plate; 1418—drain hole; 1419—second perforated plate; 145—second cavity; 146—flow guide passage.

DETAILED DESCRIPTION OF EMBODIMENTS

The technical solutions of the embodiments of the present disclosure will be described below with reference to the accompanying drawings of the embodiments of the present disclosure in order to further clarify the objects, technical solutions, and advantages of the embodiments of the present disclosure.

An object of the present disclosure is to provide a reaction tower, a production system, and a production method for producing potassium manganate, by which potassium manganate can be produced at an improved rate with an improved percent conversion of manganese dioxide in manganese ore powder, so as to facilitate the production of potassium manganate.

In a first aspect, an embodiment of the present disclosure provides a reaction tower for producing potassium manganate, including a reaction tower body and a bubble generator. The reaction tower body has a reaction chamber therein. The bubble generator includes an outer housing. The outer housing is disposed in the reaction chamber. The outer housing has a gas flow channel therein. The outer housing is configured to direct an external reactant gas into the gas flow channel. The outer housing is provided with multiple first pores each having a diameter less than 10 mm. The gas flow channel communicates with the reaction chamber via the first pores.

During production of potassium manganate, the reaction chamber contains manganese ore powder and lye. After an external reactant gas is directed into the gas flow channel, the reactant gas will enter the reaction chamber through the multiple first pores. Because the reaction chamber is filled with lye, bubbles will be generated after the reactant gas is introduced into the lye. Moreover, the first pores have a diameter less than 10 mm, therefore bubbles with a small diameter (small bubbles) are generated after the reactant gas is introduced into the lye through the first pores, thereby increasing the contact area of the reactant gas, lye, and manganese ore powder, in the form of the gas-liquid-solid phases. Thus, potassium manganate can be produced at an improved rate with an improved percent conversion of manganese dioxide in the manganese ore powder, so as to facilitate the production of potassium manganate.

In a possible embodiment, there are a plurality of bubble generators, and the plurality of bubble generators are disposed in the reaction chamber at intervals from top to bottom.

A plurality of reaction zones can be formed in the reaction chamber by generating bubbles by a plurality of bubble generators arranged vertically. Multiple reaction sites can be generated in one of the reaction zones by multiple first pores in each of the bubble generators, and the reactants are circulated in the reaction chamber, thereby further improving the reaction rate and the percent conversion of manganese dioxide in the manganese ore powder.

In a possible embodiment, a plurality of first reactant gas inlets are disposed in a side wall of the reaction tower body from top to bottom, and each of the first reactant gas inlets is connected to the outer housing of one of the bubble generators and communicates with the corresponding gas flow channel.

Multi-stage gas intakes are formed without being affected by each other by providing the plurality of reactant gas inlets. Moreover, the reactant gas inlets are disposed individually corresponding to the bubble generators, so that a plurality of reaction zones are formed in the reaction chamber.

In a possible embodiment, the reaction tower further includes a circulation pipe, wherein the circulation pipe is vertically disposed in the reaction chamber, and the circulation pipe has a first channel having both ends communicating with the reaction chamber.

The reactant gas enters the reaction chamber through the multiple first pores. The reactant gas will drive part of the lye and manganese ore powder to move upwards due to a low gas density. When they move to the upper end portion of the circulation pipe, the lye and manganese ore powder which have higher densities will enter the circulation pipe and flow out from the lower end portion of the circulation pipe, so that a self-circulating flow is formed inside the reaction chamber, so as to improve the percent conversion of manganese dioxide in the manganese ore powder.

In a possible embodiment, the circulation pipe is connected to the outer housing, the first channel is formed by an inner circumferential wall of the circulation pipe, a gap is provided between an outer circumferential wall of the circulation pipe and an inner wall of the reaction tower body, to form a second channel, and the first pores are configured to deliver the reactant gas from the gas flow channel to the second channel.

There are a large number of small bubbles around the bubble generator. The circulation pipe is mounted to the bubble generator. The materials outside the circulation pipe (the materials in the second channel) have a lower density. This results in an increased density difference between the materials inside and outside the circulation pipe, so that a better self-circulation effect can be obtained, so as to facilitate a chemical reaction for production of potassium manganate.

In a possible embodiment, there are a plurality of circulation pipes, and there is a gap between two adjacent circulation pipes in the vertical direction. The arrangement of a plurality of circulation pipes allows for a shortened fluid circulation path, an improved circulation efficiency, and an increased reaction rate, and thus facilitates the production of potassium manganate.

In a possible embodiment, the outer housing includes a first housing and a first perforated plate, the gas flow channel is provided in the first housing, the circulation pipe extends through the first housing, the first perforated plate is located outside the first housing, the two ends of the first perforated plate are respectively connected to the circumferential wall of the first housing and the circumferential wall of the circulation pipe, so that a first cavity is formed by enclosing the outer wall of the first housing, the circumferential wall of the circulation pipe and the first perforated plate, the first pores are provided in the first perforated plate, the first pores communicate with the first cavity, and the first housing is provided with multiple second pores which communicate the gas flow channel and the first cavity.

The first cavity is located around the outer circumference of the circulation pipe. Multiple second pores are provided such that the reactant gas can be distributed evenly around the outer circumference of the circulation pipe (in the gas flow channel). The first perforated plate is located around the outer circumference of the circulation pipe. Multiple first pores are provided such that the reactant gas can be distributed outside the circulation pipe after passing through the first pores. Moreover, small bubbles are distributed around the outer circumference of the circulation pipe, to facilitate the production of potassium manganate and facilitate the formation of a self-circulating flow.

In a possible embodiment, the second pore has a diameter of 5 to 20 times the diameter of the first pore. The relationship between the diameters of the second pores and the first pores is limited, so that the reactant gas in the gas flow channel can firstly pass through the second pores and then be distributed evenly in the first cavity, and then small bubbles are formed in the reaction chamber after the reactant gas passes through the first cavity. This facilitates the production of potassium manganate.

In a possible embodiment, the first pores in the first perforated plate and the second pores in the first housing are distributed evenly around the circumferential direction of the circulation pipe.

In this way, the reactant gas in the first cavity can be distributed evenly. Small bubbles are formed after the reactant gas enters the reaction chamber. The small bubbles are distributed evenly around the outer circumference of the circulation pipe, so that a self-circulating flow can be formed around the circulation pipe, so as to facilitate the production of potassium manganate.

In a possible embodiment, the first perforated plate is located above the first housing, one end of the first perforated plate is connected to an outer circumference of an upper surface of the first housing, and the multiple second pores are evenly provided in the upper surface of the first housing.

Because the reactant gas has a low density, the reactant gas will move upward after the reactant gas is introduced into the gas flow channel. Therefore, the first perforated plate is disposed above the first housing to facilitate the formation of small bubbles so as to improve the efficiency of production of potassium manganate.

In a possible embodiment, a lower surface of the first housing is provided with a drain hole, via which the gas flow channel is communicated with the reaction chamber.

Due to the arrangement of the first pores and the second pores, part of the lye or/and the manganese ore powder mixed with the lye may enter the gas flow channel, which will affect the generation of small bubbles. Therefore, a drain hole is provided in the lower surface of the first housing to facilitate discharge of the lye or/and the manganese ore powder mixed with the lye from the gas flow channel.

In a possible embodiment, the first perforated plate is recessed in a direction away from the first cavity; or the first perforated plate has an axial section in the shape of a straight plate.

If the first perforated plate is recessed in a direction away from the first cavity, the surface area of the first perforated plate can be increased, so that more first pores can be provided therein to allow the generation of small bubbles. If the first perforated plate has an axial section in the shape of a straight plate, the lye will flow down the inclined first perforated plate when it is in contact with the first perforated plate, so that the reactant gas in the first pores can be in uniform contact with the lye, so as to form small bubbles.

In a possible embodiment, a second reactant gas inlet is provided at a drain outlet of the reaction tower body, and the second reactant gas inlet communicates with the reaction chamber in the reaction tower body.

The reacted materials are discharged out of the reaction chamber from the drain outlet. Since the manganese dioxide in part of the manganese ore powder may not have reacted, a second reactant gas inlet is provided at the drain outlet so that the reactant gas concentratedly reacts with the remaining manganese dioxide to produce potassium manganate. This improves the percent conversion of manganese dioxide.

In a second aspect, an embodiment of the present disclosure provides a system for producing potassium manganate, including a potassium manganate crystallization device, a potassium manganate separation device, and the reaction tower described above, wherein a drain outlet of the reaction tower body communicates with the potassium manganate crystallization device, and the potassium manganate separation device communicates with the potassium manganate crystallization device.

After the reaction is carried out in the reaction chamber, the materials are discharged from the drain outlet. The discharged materials are crystallized in the potassium manganate crystallization device and then separated in the potassium manganate separation device, so as to obtain relatively pure potassium manganate.

In a third aspect, an embodiment of the present disclosure provides a method for producing potassium manganate, which is applicable to the system for producing potassium manganate described above. The production method includes: introducing a reactant gas into the gas flow channel through the outer housing and into the reaction chamber of the reaction tower body through the first pores, so that the reactant gas is converted into small bubbles which are mixed and reacted with lye and manganese ore powder in the reaction chamber of the reaction tower body. The reacted materials are expelled from the drain outlet to the potassium manganate crystallization device for crystallization and then expelled to the potassium manganate separation device for separation.

The reactant gas is firstly directed into the gas flow channel and then discharged from the gas flow channel through the first pores, and the reactant gas passing through the first pores having a diameter less than 10 mm is in contact with lye, to form small bubbles, thereby increasing the contact area of the reactant gas, lye, and manganese ore powder in the form of the gas-liquid-solid phases. Thus, potassium manganate can be produced at an improved rate with an improved percent conversion of manganese dioxide in the manganese ore powder, so as to facilitate the production of potassium manganate. Then, the reacted materials are discharged from the drain outlet. The discharged materials are crystallized in the potassium manganate crystallization device and then separated in the potassium manganate separation device, so as to obtain relatively pure potassium manganate.

FIG. 1 is a schematic process structural view of a system for producing potassium manganate according to an embodiment of the present disclosure. Referring to FIG. 1, the present disclosure provides a system for producing potassium manganate, which includes a reaction tower 10, a potassium manganate crystallization device 20, a potassium manganate separation device 30, and a residual gas purification device 40. The upper end of the reaction tower 10 communicates with the residual gas purification device 40, and the lower end of the reaction tower body 11 communicates with the potassium manganate crystallization device 20 and the potassium manganate separation device 30.

Figure 2:
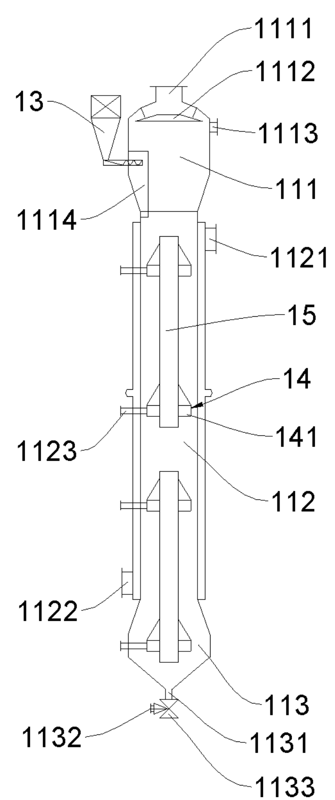
FIG. 2 is a schematic structural view of a reaction tower according to an embodiment of the present disclosure.

FIG. 2 is a schematic structural view of the reaction tower 10 according to an embodiment of the present disclosure. Referring to FIG. 1 together with FIG. 2, the reaction tower 10 includes a reaction tower body 11, and the reaction tower body 11 has a reaction chamber 12 therein. Optionally, the reaction tower body 11 has a feeding section 111, a reaction section 112, and a discharging section 113 disposed in sequence from top to bottom. The feeding section 111 is used mainly for feeding of manganese ore powder and lye, and expelling of off-gas. The residual gas purification device 40 is connected to and communicated with the feeding section 111.

The feeding section 111 is provided with a residual gas outlet 1111, a gas cap 1112, a lye inlet 1113, and a manganese ore powder inlet 1114. Optionally, the lye inlet 1113 and the manganese ore powder inlet 1114 are provided in the side wall of the feeding section 111. The gas cap 1112 is provided in the feeding section 111. The residual gas outlet 1111 is provided in the top wall of the feeding section 111. The residual gas outlet 1111 is connected to the residual gas purification device 40. The residual gas enters the residual gas purification device 40 from the residual gas outlet 1111 after passing through the gas cap 1112.

The residual gas purification device 40 has a gas inlet 41 and a gas outlet 42. The residual gas outlet 1111 communicates with the gas inlet 41 via a residual gas pipeline 43. The residual gas in the reaction tower body 11 is expelled from the residual gas outlet 1111 after passing through the gas cap 1112, to enter the residual gas pipeline 43, and is introduced from the gas inlet 41 into the residual gas purification device 40 in which it is purified, and then is discharged from the gas outlet 42. In this way, the off-gas is purified and then discharged to the air to avoid air pollution. Having been provided with the residual gas outlet 1111, the reaction chamber 12 in the reaction tower body 11 can be communicated with the outside air, so that the pressure in the reaction tower body 11 is at normal pressure, and thus the pressure condition for the reaction can be reduced.

Lye is introduced into the reaction chamber 12 of the reaction tower body 11 through the lye inlet 1113. Manganese ore powder is introduced into the reaction chamber 12 of the reaction tower body 11 through the manganese ore powder inlet 1114. Here, the lye may be a potassium hydroxide solution. The potassium hydroxide solution introduced into the reaction tower body 11 is at a temperature of 250° C. or higher. The manganese ore powder contains manganese dioxide as a main effective substance. Manganese dioxide may account for 45% or more by weight of the manganese ore powder, may be activated at a temperature of 260° C. or lower, and may have a particle size of 200 meshes or more, to facilitate the reaction.

Both the lye inlet 1113 and the manganese ore powder inlet 1114 are located at the upper end (feeding section 111) of the reaction tower body 11. When the lye and the manganese ore powder enter the reaction chamber 12 of the reaction tower body 11, they will move to the reaction section 112. The reactants can react in the reaction section 112 and in the discharging section 113, thus the reaction time can be prolonged to improve the percent conversion of the manganese ore powder. Further, the manganese ore powder inlet 1114 is connected to an automatic screw feeder 13. The manganese ore powder is delivered from the manganese ore powder inlet 1114 into the reaction chamber 12 of the reaction tower body 11 by the automatic screw feeder 13 at a speed of 1 to 2 t/h.

The reaction section 112 of the reaction tower body 11 is provided with a hot air inlet 1121 and a hot air outlet 1122. Hot air is fed into the reaction tower body 11 through the hot air inlet 1121, and the hot air is expelled from the reaction tower body 11 through the hot air outlet 1122. The hot air fed into the reaction tower body 11 may be at a temperature of 250 to 300° C. The interior of the reaction tower body 11 can be heated and kept hot by the hot air fed therein, so that the liquid phase in the reaction tower body 11 is maintained at a temperature between 250 and 270° C.

Optionally, the hot air inlet 1121 is located on a side of the reaction section 112 close to the feeding section 111, and the hot air outlet 1122 is located on a side of the reaction section 112 close to the discharging section 113, so that the hot air can flow from top to bottom and then be expelled from the reaction chamber 12. In this way, the hot air flows opposite to the materials in the tower. There is a large temperature difference between the hot air and the materials, which enhances the heat exchange effect and thus facilitates the heating and heat preservation of the materials in the tower.

A first reactant gas inlet 1123 is disposed in the reaction section 112 and/or the discharging section 113 of the reaction tower body 11. For example, a first reactant gas inlet 1123 is disposed in the reaction section 112 and/or the discharging section 113 of the reaction tower body 11. For example, a first reactant gas inlet 1123 is disposed in the side wall of the reaction section 112, or a first reactant gas inlet 1123 is disposed in the side wall of the discharging section 113, or a first reactant gas inlet 1123 is disposed in each of the side wall of the reaction section 112 and the side wall of the discharging section 113, or a plurality of first reactant gas inlets 1123 are disposed from top to bottom in the side wall of the reaction section 112, or a plurality of first reactant gas inlets 1123 are disposed from top to bottom in the side wall of the discharging section 113, or a plurality of first reactant gas inlets 1123 are disposed from top to bottom in each of the side wall of the reaction section 112 and the side wall of the discharging section 113. It is not limited in the embodiments of the present disclosure. A case where three first reactant gas inlets 1123 are disposed from top to bottom in the side wall of the reaction section 112 and one first reactant gas inlet 1123 is disposed in the side wall of the discharging section 113 will be described below as an example.

The four first reactant gas inlets 1123 are arranged in sequence from top to bottom, and the four first reactant gas inlets 1123 are all used for introducing a reactant gas therethrough. The reactant gas may be an oxygen-rich reactant gas. Here, the oxygen-rich reactant gas may be compressed air, or a mixture of oxygen and compressed air, or oxygen, or the like, which is not limited in the embodiments of the present disclosure.

After the oxygen-rich reactant gas, lye, and manganese ore powder are added to the reaction tower body 11, a chemical reaction occurs in the reaction tower body 11 to obtain potassium manganate, where the reaction formula is as follows: 2KOH (liquid phase)+$MnO_2$ (solid phase)+½$O_2$ (gas phase)=$K_2MnO_4$+$H_2O$−Q. Since the reaction for producing potassium manganate is an endothermic reaction, the temperature in the tower may be maintained in an appropriate range, or the oxygen-rich reactant gas may first be preheated to 250° C. or higher and then introduced into the reaction tower body 11 through the reactant gas inlets, in order to ensure the reaction rate.

A drain outlet 1131 is provided in the lower part of the discharging section 113 of the reaction tower body 11. The drain outlet 1131 is used for discharging the reacted materials in the discharging section 113 from the reaction chamber 12 of the reaction tower body 11. The reacted materials may contain some unreacted manganese dioxide. Therefore, a second reactant gas inlet 1132 is provided at the drain outlet 1131. The second reactant gas inlet 1132 communicates with the reaction chamber 12 in the reaction tower body 11. The second reactant gas inlet 1132 is also used for introducing the preheated oxygen-rich reactant gas therethrough, so that oxygen in the oxygen-rich reactant gas can react with the remaining unreacted manganese dioxide, thereby improving the percent conversion of manganese dioxide in the manganese ore powder.

Further, the drain outlet 1131 of the reaction tower body 11 also communicates with the potassium manganate crystallization device 20, and the potassium manganate separation device 30 communicates with the potassium manganate crystallization device 20. A three-way valve 1133 may be disposed at the drain outlet 1131. The first connector of the three-way valve 1133 communicates with the drain outlet 1131, the second connector of the three-way valve 1133 communicates with the second reactant gas inlet 1132, and the third connector of the three-way valve 1133 communicates with the potassium manganate crystallization device 20. The valve core of the three-way valve 1133 is controlled to control entry of the reactant gas into the reaction tower 10 or entry of the reacted materials into the potassium manganate crystallization device 20.

The reacted materials pass through the three-way valve 1133 via the drain outlet 1131 in the discharging section 113 and then enter the potassium manganate crystallization device 20 for crystallization, and then enter the potassium manganate separation device 30 for separation, so that potassium manganate is separated from the unreacted lye, to obtain relatively pure potassium manganate.

In the embodiment of the present disclosure, potassium manganate is produced according to the following reaction formula: 2KOH (liquid phase)+$MnO_2$ (solid phase)+½$O_2$ (gas phase)=$K_2MnO_4$+$H_2O$−Q. Because the reactants are in contact with one another in the form of three phases (i.e., liquid phase, solid phase, and gas phase), mass transfer and gain and loss of electrons occur among the activated manganese dioxide molecules, oxygen radicals, potassium ions, and hydroxide ions during the reaction, whereby potassium manganate and water are generated, and heat is absorbed. The inventors have found that the rate of the reaction represented by the above reaction formula is determined mainly by an interphase mass transfer coefficient $K_{La}$, and the interphase mass transfer coefficient $K_{La}$ is affected by the following main factors.

(1) The Surface Area of the Gas Phase Membrane: The surface area of the gas phase membrane is related to the radius of bubbles. A bubble in the liquid phase is approximately regarded as a spherical shape. When the same volume of gas is divided equally into n bubbles, the total surface area S of the bubbles and the radius R of the bubbles have the following relationship: $N_1 \times 4/3\pi R_1^3 = N_2 \times 4/3\pi R_2^3$, where $N_1$ is the number of bubbles with a radius of $R_1$, and $N_2$ is the number of bubbles with a radius of $R_2$.

If $R_2=½R_1$, the radius of current bubbles is half of the radius of original bubbles. Correspondingly, $N_2=8N_1$. Namely, the total number of the current bubbles is 8 times the total number of the original bubbles in the case where the bubbles have the same total volume. When the bubbles have a radius of $R_1$, the bubbles have a total surface area $S_1=N_1 4\pi R_1^2$. When the bubbles have a radius of $R_2$, the bubbles have a total surface area $S_2=N_2 4\pi R_2^2$. It can be calculated that $S_2:S_1=2:1$, indicating that the total surface area of the bubbles is twice that of the original bubbles when the radius of the bubbles is reduced by half. It is indicated that bubbles with a smaller radius has a larger total surface area and results in a larger interphase mass transfer coefficient $K_{La}$.

(2) The Number of Oxygen Radicals: When the temperature of the gas phase is increased to reach a temperature at which oxygen is activated, the number of oxygen radicals can be increased. Therefore, when the temperature of the oxygen-rich reactant gas is higher than 250° C., a larger number of oxygen radicals are obtained, and a larger interphase mass transfer coefficient $K_{La}$ is obtained.

(3) The Number of Activated Manganese Dioxide Molecules: The factors that affect the number of activated manganese dioxide molecules include the size of the manganese dioxide particles and the temperature of the liquid phase. When the manganese dioxide particles have a smaller size and/or the liquid phase is at a higher temperature, a greater number of activated manganese dioxide molecules will be generated. Therefore, the interphase mass transfer coefficient $K_{La}$ can be improved by adding manganese ore powder with a particle size of 200 meshes or more through a screw feeder, and/or by controlling the liquid phase in the reaction chamber 12 at a temperature between 250 and 270° C.

(4) The Rate of Circulation of the Gas-liquid-solid Phases: A certain self-circulating flow can be formed by the gas-liquid-solid phases, which can improve the interphase mass transfer coefficient $K_{La}$.

Each of the above four factors affects the rate of the reaction for production of potassium manganate. The rate of the reaction for production of potassium manganate can be improved by satisfying one of these factors. If more than one of the factors is satisfied, the reaction rate can be further improved.

Figure 3:
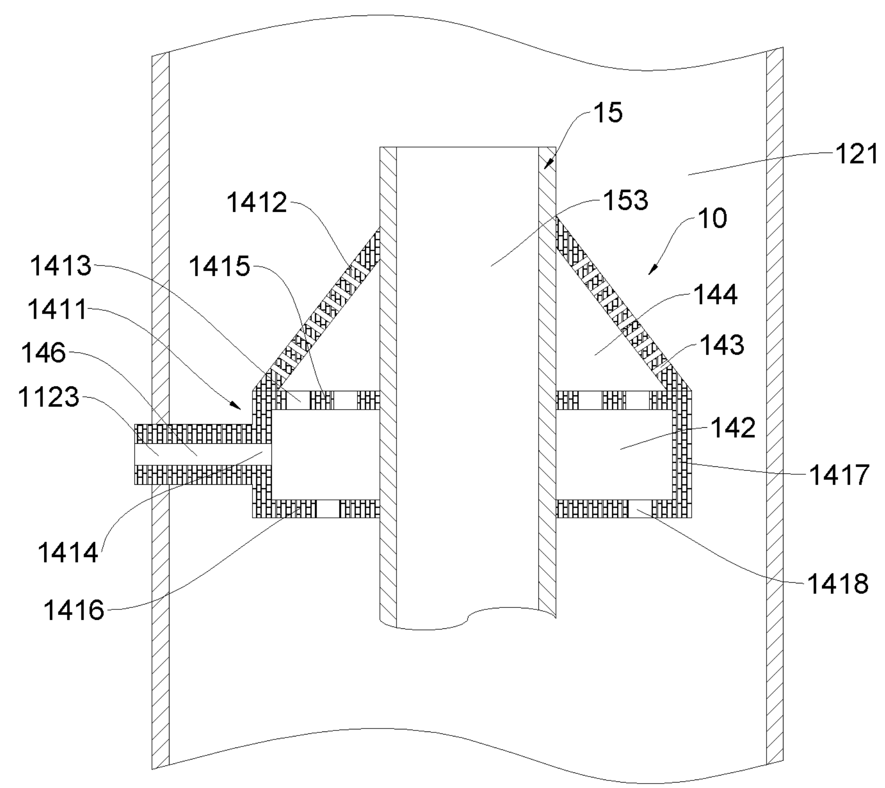
FIG. 3 is a first partial sectional view of a bubble generator according to an embodiment of the present disclosure.
Figure 4:
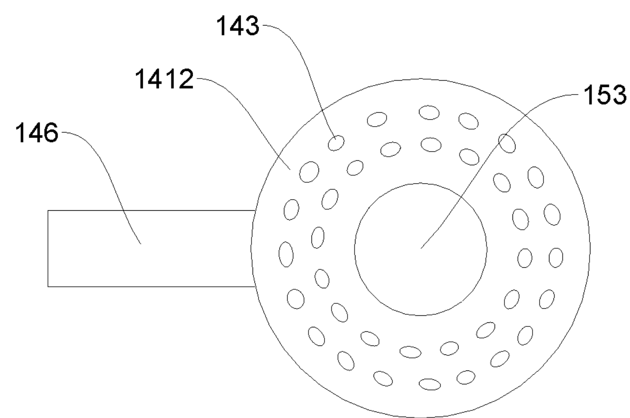
FIG. 4 is a top view of a bubble generator according to an embodiment of the present disclosure.

In order to satisfy the above factor (1), the inventors have made an improvement in such a manner that a bubble generator 14 is disposed in the reaction tower body 11. In other words, a bubble generator 14 is disposed in the reaction chamber 12 of the reaction tower body 11. FIG. 3 is a first partial sectional view of the bubble generator 14 according to an embodiment of the present disclosure; and FIG. 4 is a top view of the bubble generator 14 according to an embodiment of the present disclosure. Referring to FIG. 3 together with FIG. 4, the bubble generator 14 includes an outer housing 141. The outer housing 141 is disposed in the reaction chamber 12. The outer housing 141 has a gas flow channel 142 therein. The outer housing 141 is configured to direct an external reactant gas into the gas flow channel 142. The outer housing 141 is connected to the side wall of the reaction tower body 11 at the first reactant gas inlet 1123, so that the gas flow channel 142 of the outer housing 141 communicates with the first reactant gas inlet 1123. The oxygen-rich reactant gas can directly enter the gas flow channel 142 through the first reactant gas inlet 1123.

The outer housing 141 is provided with multiple first pores 143 each having a diameter less than 10 mm, and the gas flow channel 142 communicates with the reaction chamber 12 via the first pores 143. The first pores 143 each have a diameter less than 10 mm. Therefore, bubbles with a small diameter (small bubbles) are generated after the reactant gas is introduced into the lye through the first pores 143 from the gas flow channel 142. Thus, the specific surface area of the bubbles is increased, so as to increase the contact area of the reactant gas, lye, and manganese ore powder in the form of the gas-liquid-solid phases, thereby improving the interphase mass transfer coefficient $K_{La}$.

Optionally, the diameter of the first pore 143 may be 0.5 mm, 1 mm, 2 mm, 3 mm, 4 mm, 5 mm, 7 mm, or 10 mm. Further, the diameter of the first pore 143 is not greater than 8 mm, or the diameter of the first pore 143 is not greater than 6 mm, or the diameter of the first pore 143 is not greater than 4 mm.

Further, referring to FIGS. 2 to 4 together, there are a plurality of first reactant gas inlets 1123, and there are also a plurality of bubble generators 14. The first reactant gas inlets 1123 are disposed to the bubble generators 14 in one-to-one correspondence. The first reactant gas inlets 1123 are disposed in the side walls of the reaction section 112 and the discharging section 113, respectively. The plurality of first reactant gas inlets 1123 are arranged in sequence from top to bottom. Correspondingly, the plurality of bubble generators 14 are also arranged in sequence from top to bottom and disposed in the reaction chamber 12. Each of the first reactant gas inlets 1123 is connected to the outer housing 141 of one of the bubble generators 14 and communicates with the corresponding gas flow channel 142.

A plurality of reaction zones can be formed in the reaction chamber 12 by generating bubbles by the plurality of bubble generators 14 arranged vertically. Multiple reaction sites can be generated in one of the reaction zones by the multiple first pores 143 in each of the bubble generators 14, and the reactants are circulated in the reaction chamber 12, thereby further improving the reaction rate.

In an embodiment of the present disclosure, in order to satisfy the above factor (4), the inventors have made an improvement in such a manner that a circulation pipe 15 is mounted in the reaction chamber 12. The circulation pipe 15 is vertically disposed in the reaction chamber 12, and both ends of the circulation pipe 15 communicate with the reaction chamber 12.

The reactant gas enters the reaction chamber 12 through the multiple first pores 143, to form small bubbles. Because the gas has a low density, the small bubbles will drive part of the lye and manganese ore powder to move upwards. When they move to the upper end portion of the circulation pipe 15 having both ends communicating with the reaction chamber 12, the lye and manganese ore powder which have higher densities will enter the circulation pipe 15 and flow out from the lower end of the circulation pipe 15, so that a self-circulating flow is formed inside the reaction chamber 12, to improve the interphase mass transfer coefficient $K_{La}$.

Further, the circulation pipe 15 has a first channel 153 having both ends communicating with the reaction chamber 12. The circulation pipe 15 is connected to the outer housing 141. The first channel 153 is formed by the inner circumferential wall of the circulation pipe 15. A gap is provided between the outer circumferential wall of the circulation pipe 15 and the inner wall of the reaction tower body, so as to form a second channel 121. The first pores 143 are configured such that the reactant gas is delivered from the gas flow channel 142 to the second channel 121 therethrough. There are a large number of small bubbles around the bubble generator 14. The circulation pipe 15 is mounted to the bubble generator 14. The materials outside the circulation pipe 15 (the materials in the second channel 121) have a lower density. This results in an increased density difference between the materials inside and outside the circulation pipe 15, so that a better self-circulation effect can be obtained, to facilitate a chemical reaction for production of potassium manganate.

In other embodiments, the circulation pipe 15 may be vertically fixed to the side wall of the reaction tower body 11, which is not limited in the embodiments of the present disclosure.

Optionally, there are a plurality of circulation pipes 15, and there is a gap between two adjacent circulation pipes 15 in the vertical direction. Optionally, the vertical spacing between two circulation pipes 15 may be between 30 and 100 cm. For example, the spacing is 30 cm, 40 cm, 50 cm, 60 cm, 70 cm, 80 cm, 90 cm, or 100 cm.

Figure 5:
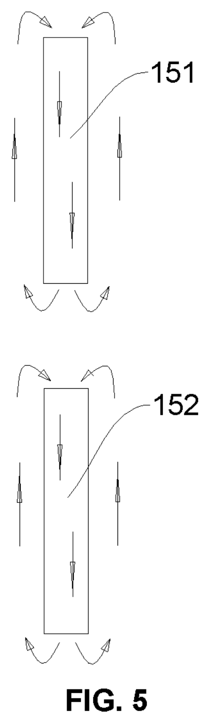
FIG. 5 is a schematic view showing self-circulating flows through two circulation pipes according to an embodiment of the present disclosure.

Further, the arrangement of a plurality of circulation pipes 15 allows for a shortened fluid circulation path and an improved circulation efficiency, thereby improving the interphase mass transfer coefficient $K_{La}$ and increasing the reaction rate. FIG. 5 is a schematic view showing self-circulating flows through two circulation pipes 15 according to an embodiment of the present disclosure. Referring to FIG. 5, for example, in an embodiment of the present disclosure, there are two vertically disposed circulation pipes 15, namely, a first circulation pipe 151 and a second circulation pipe 152. As shown in the figure, the first circulation pipe 151 is located above the second circulation pipe 152, both the first circulation pipe 151 and the second circulation pipe 152 are disposed vertically, and there is a certain gap between the first circulation pipe 151 and the second circulation pipe 152. A total of four first reactant gas inlets 1123 are located in the reaction section 112 and the discharging section 113. Correspondingly, there may be four bubble generators 14, and the four bubble generators 14 are disposed in sequence from top to bottom. The two ends of the first circulation pipe 151 are connected to the two upper bubble generators 14, respectively, and the two ends of the second circulation pipe 152 are connected to the two lower bubble generators 14, respectively.

Self-circulating flows are formed through the first circulation pipe 151 and the second circulation pipe 152 in the following manner. Firstly, the three-phase materials outside the first circulation pipe 151 rise from the lower end of the first circulation pipe 151 to the upper end of the first circulation pipe 151, and then the solid-phase and liquid-phase materials enter the first circulation pipe 151 and then flow out from the lower end of the first circulation pipe 151, and are mixed again with the gas-phase material and then circulate upward to the upper end of the first circulation pipe 151, to form a first self-circulating flow. Secondly, the three-phase materials outside the second circulation pipe 152 rise from the lower end of the second circulation pipe 152 to the upper end of the second circulation pipe 152, and then the solid-phase and liquid-phase materials enter the second circulation pipe 152 and then flow out from the lower end of the second circulation pipe 152, and are mixed again with the gas-phase material and then circulate upward to the upper end of the second circulation pipe 152, to form a second self-circulating flow.

In other embodiments, the number of first reactant gas inlets 1123 may be changed, and the number of bubble generators 14 may also be changed accordingly, and the number of circulation pipes 15 may also be changed accordingly. Their numbers may be adjusted according to the height of the reaction tower body 11 and are not limited in the embodiments of the present disclosure.

A structure for connecting the bubble generator 14 and the circulation pipe 15 will be specifically described below, in order to combine the bubble generator 14 with the circulation pipe 15 well to obtain a better improved interphase mass transfer coefficient $K_{La}$ for production of potassium manganate.

With continued reference to FIGS. 3 and 4, the outer housing 141 includes a first housing 1411 and a first perforated plate 1412. The first housing 1411 has a gas flow channel 142 therein. The circulation pipe 15 extends through the first housing 1411. The first perforated plate 1412 is located outside the first housing 1411. The two ends of the first perforated plate 1412 are respectively connected to the circumferential wall of the first housing 1411 and the circumferential wall of the circulation pipe 15, so that a first cavity 144 is formed by enclosing the outer wall of the first housing 1411, the circumferential wall of the circulation pipe 15, and the first perforated plate 1412. The first pores 143 are provided in the first perforated plate 1412. The first pores 143 communicate with the first cavity 144. The first housing 1411 is provided with multiple second pores 1413, which communicate the gas flow channel 142 and the first cavity 144.

The two ends of the first perforated plate 1412 are connected to the circumferential wall of the first housing 1411 and the circumferential wall of the circulation pipe 15, respectively. Therefore, the gas flow channel 142 is provided around the outer circumference of the circulation pipe 15 located in the first housing 1411. The first cavity 144 is provided around the outer circumference of the circulation pipe 15 located between the first housing 1411 and the first perforated plate 1412. The multiple second pores 1413 are provided such that the reactant gas can be firstly uniformly distributed around the outer circumference of the circulation pipe 15 (in the gas flow channel 142). Then, the multiple first pores 143 are provided such that small bubbles can be generated after the reactant gas passes through the first pores 143. Moreover, the small bubbles are distributed around the outer circumference of the circulation pipe 15, to facilitate the production of potassium manganate and to facilitate the formation of a self-circulating flow, so as to obtain an improved interphase mass transfer coefficient $K_{La}$.

Optionally, in an embodiment of the present disclosure, the outer housing 141 further includes a flow guide passage 146. The first housing 1411 is in an approximately cylindrical structure with two closed ends and a hollow interior, in which a gas flow channel 142 is formed, and an opening 1414 is provided in the side wall of the cylindrical first housing 1411. The flow guide passage 146 has one end communicating with the first reactant gas inlet 1123, and the other end communicating with the opening 1414. In other words, the flow guide passage 146 has one end connected to the side wall of the reaction tower body 11 at the first reactant gas inlet 1123, and the other end connected to the side wall of the first housing 1411 at the opening 1414. The reactant gas introduced from the first reactant gas inlet 1123 enters the gas flow channel 142 through the flow guide passage 146.

In an embodiment of the present disclosure, the first housing 1411 includes a circular upper plate 1415 (upper surface), a circular lower plate 1416 (lower surface), and an annular plate 1417. The annular plate 1417 is provided with an opening 1414. The circulation pipe 15 extends through the upper plate 1415 and the lower plate 1416. The circulation pipe 15 is fixedly connected to the upper plate 1415 and also to the lower plate 1416, so that a gas flow channel 142 is formed by enclosing the outer circumferential wall of the circulation pipe 15 located between the upper plate 1415 and the lower plate 1416, the inner wall of the upper plate 1415, the inner wall of the lower plate 1416, and the circumferential wall of the first housing 1411. The circulation pipe 15 is disposed approximately coaxially with the cylindrical first housing 1411, and the formed gas flow channel 142 is in an approximately ring-shaped structure.

In other embodiments, the circulation pipe 15 may not be disposed coaxially with the cylindrical first housing 1411, and the circulation pipe 15 may be deviated from the axis of the cylindrical first housing 1411. The diameter of the first housing 1411 and the diameter of the circulation pipe 15 may be adjusted according to the inner diameter of the housing of the reaction tower 10 and are not limited in the embodiments of the present disclosure.

Optionally, the first perforated plate 1412 is located above the first housing 1411. The first perforated plate 1412 has one end connected to the outer circumference of the upper surface of the first housing 1411 (the outer circumference of the upper plate 1415), and has the other end connected to the outer circumference of the circulation pipe 15. The end of the first perforated plate 1412 away from the upper plate 1415 extends in a direction away from the first housing 1411. The first perforated plate 1412 has approximately the same shape as a circumferential surface of a structure in a shape of circular truncated cone. A first cavity 144 is formed by enclosing the inner wall of the first perforated plate 1412, the outer wall of the upper plate 1415, and the outer circumferential wall of the circulation pipe 15 located between the first perforated plate 1412 and the upper plate 1415.

Multiple second pores 1413 are provided evenly in the upper surface (upper plate 1415) of the first housing 1411. Both the first pores 143 in the first perforated plate 1412 and the second pores 1413 in the first housing 1411 (the second pores 1413 in the upper plate 1415) are distributed evenly around the circumferential direction of the circulation pipe 15. The reactant gas entering the flow guide passage 146 from the first reactant gas inlet 1123 enters the gas flow channel 142 and then enters the first cavity 144 through the second pores 1413, and then passes through the first pores 143 to generate small bubbles in the reaction chamber 12.

The gas flow channel 142 and the first cavity 144 are separated as two cavities, and the two cavities communicate with each other via the second through holes. This can reduce the disadvantage of uneven distribution of the reactant gas in the first cavity 144 due to blockage by the circulation pipe 15. In this way, the reactant gas can be firstly distributed evenly in the annular gas flow channel 142, then evenly pass through the second pores 1413 to evenly enter the first cavity 144, and then evenly pass through the first pores 143 to evenly enter the reaction chamber 12 (the second channel 121) around the outer circumference of the circulation pipe 15, so as to form a self-circulating flow in cooperation with the circulation pipe 15.

Figure 6:
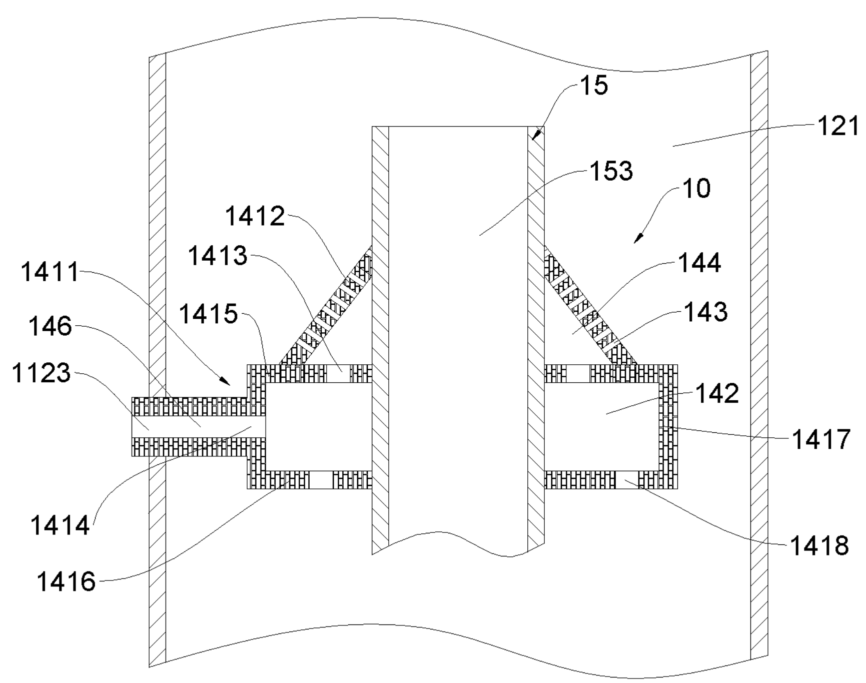
FIG. 6 is a second partial sectional view of a bubble generator according to an embodiment of the present disclosure.

In other embodiments, FIG. 6 is a second partial sectional view of the bubble generator 14 according to an embodiment of the present disclosure. Referring to FIG. 6, the end of the first perforated plate 1412 away from the outer circumferential wall of the circulation pipe 15 may not be connected to the outer circumference of the upper plate 1415. The first perforated plate 1412 is connected to the upper plate 1415 at a position between the outer circumference of the upper plate 1415 and a portion of the upper plate 1415 connected to the circulation pipe 15, so as to form a first cavity 144. Correspondingly, the second pore 1413 is provided at a position between the portion of the upper plate 1415 connected to the first perforated plate 1412 and the portion of the upper plate 1415 connected to the circulation pipe 15.

Optionally, with continued reference to FIG. 3, the diameter of the second pore 1413 is 5 to 20 times the diameter of the first pore 143. A part of the reactant gas entering the gas flow channel 142 enters the first cavity 144 through the second pores 1413 on the side close to the opening 1414. A part of the reactant gas flows toward the side of the gas flow channel 142 away from the opening 1414, so that the reactant gas is distributed evenly in the entire gas flow channel 142 and then enters the first cavity 144 through the second pores 1413. In this way, the reactant gas is distributed evenly in the first cavity 144.

Optionally, the diameter of the second pore 1413 is 8 to 15 times the diameter of the first pore 143. Further, the diameter of the second pore 1413 is 10 to 12 times the diameter of the first pore 143. For example, the diameter of the second pore 1413 is 5 times, 8 times, 10 times, 12 times, 15 times, 18 times, or 20 times the diameter of the first pore 143.

Optionally, the diameter of the flow guide passage 146 is smaller than the distance between the upper plate 1415 and the lower plate 1416, so that a gas flow channel 142 with a larger volume can be obtained, whereby it takes a longer time to fill the gas flow channel 142 with the reactant gas, and thus it is easier to obtain a uniform distribution of the reactant gas in the gas flow channel 142.

When the lye and the manganese ore powder in the lye are in contact with the first pores 143, some of the liquid may enter the first cavity 144 and then enter the gas flow channel 142. Therefore, in an embodiment of the present disclosure, a drain hole 1418 is provided in the lower surface (lower plate 1416) of the first housing 1411. The gas flow channel 142 communicates with the reaction chamber 12 via the drain hole 1418, which facilitates discharge of the lye or/and the manganese ore powder mixed with the lye from the gas flow channel 142.

In an embodiment of the present disclosure, the first perforated plate 1412 has an axial section in the shape of a straight plate. When the lye is in contact with the first perforated plate 1412, the lye will flow down the inclined first perforated plate 1412, so that the reactant gas in the first pores 143 can be in uniform contact with the lye to form small bubbles.

In other embodiments, the first perforated plate 1412 is recessed in a direction away from the first cavity 144, so that the surface area of the first perforated plate 1412 can be increased and thus more first pores 143 can be provided therein to allow the generation of small bubbles.

Figure 7:
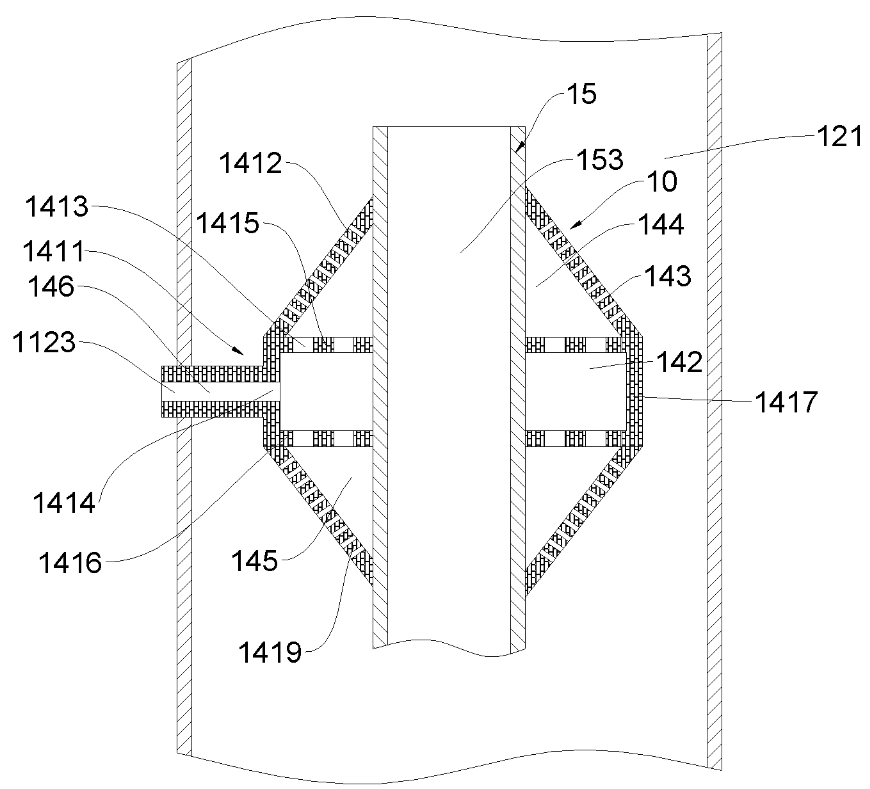
FIG. 7 is a third partial sectional view of a bubble generator according to an embodiment of the present disclosure.

In another embodiment, FIG. 7 is a third partial sectional view of the bubble generator 14 according to an embodiment of the present disclosure. Referring to FIG. 7, there are two perforated plates, namely, a first perforated plate 1412 and a second perforated plate 1419. A first perforated plate 1412 is connected to and disposed above the first housing 1411, and a second perforated plate 1419 is connected to and disposed under the first housing 1411. A connection structure of the second perforated plate 1419 under the first housing 1411 will be described in detail below.

The second perforated plate 1419 is located under the first housing 1411. The second perforated plate 1419 has one end connected to the outer circumference of the lower surface of the first housing 1411 (the outer circumference of the lower plate 1416), and the other end connected to the outer circumference of the circulation pipe 15. The end of the second perforated plate 1419 away from the lower plate 1416 extends in a direction away from the first housing 1411. The second perforated plate 1419 has approximately the same shape as a circumferential surface of a structure in a shape of circular truncated cone. A second cavity 145 is formed by enclosing the inner wall of the second perforated plate 1419, the outer wall of the lower plate 1416, and the outer circumferential wall of the circulation pipe 15 located between the second perforated plate 1419 and the lower plate 1416.

Multiple second pores 1413 are provided evenly in the lower surface (lower plate 1416) of the first housing 1411. Both the first pores 143 in the second perforated plate 1419 and the second pores 1413 in the first housing 1411 (the second pores 1413 in the lower plate 1416) are distributed evenly around the circumferential direction of the circulation pipe 15. The reactant gas entering the flow guide passage 146 from the first reactant gas inlet 1123 enters the gas flow channel 142 and then enters the second cavity 145 through the second pores 1413, and then passes through the first pores 143 to generate small bubbles in the reaction chamber 12.

In another embodiment, it is also possible that the second perforated plate 1419 is disposed under the first housing 1411 while the first perforated plate 1412 is not disposed above the first housing 1411. This is not limited in the embodiments of the present disclosure.

An embodiment of the present disclosure provides a method for producing potassium manganate, which is applicable to the system for producing potassium manganate described above, wherein the production method includes: introducing a reactant gas into the gas flow channel 142 through the outer housing 141 and into the reaction chamber 12 of the reaction tower body 11 through the first pores 143, so that the reactant gas is converted into small bubbles which are mixed and reacted with lye and manganese ore powder in the reaction chamber 12 of the reaction tower body 11. The reacted materials are expelled from the drain outlet 1131 to the potassium manganate crystallization device 20 for crystallization and then expelled to the potassium manganate separation device 30 for separation.

Further, the oxygen-rich reactant gas enters the flow guide passage 146 from the first reactant gas inlet 1123, and then enters the gas flow channel 142 through the inlet, so that the reactant gas is distributed evenly in the gas flow channel 142. Then, the reactant gas passes through the evenly distributed second pores 1413 and is distributed evenly in the first cavity 144, and then passes through the evenly distributed first pores 143 and enters the reaction chamber 12 and forms small bubbles. The small bubbles are in contact with lye and manganese ore powder in the reaction chamber 12 of the reaction tower body 11, so that a three-phase reaction is carried out to obtain the reacted mixture materials.

Moreover, the materials in the reaction move upward from the lower end of the circulation pipe 15 to the upper end of the circulation pipe 15, so that the lye and the manganese ore powder enter the first channel 153 of the circulation pipe 15 and then enter the reaction chamber 12 from the lower end of the circulation pipe 15.

When the reacted mixture materials enter the drain outlet 1131, the three-way valve 1133 is controlled to communicate the drain outlet 1131 and the second reactant gas inlet 1132, and the oxygen-rich reactant gas is introduced into the drain outlet 1131, so that the oxygen-rich reactant gas is in contact with the mixture materials at the drain outlet 1131, so as to cause further reaction of the unreacted manganese dioxide. Then, the three-way valve 1133 is controlled to communicate the drain outlet 1131 and the potassium manganate crystallization device 20, so that the reacted materials enter and are crystallized in the potassium manganate crystallization device 20, and then enter and are separated in the potassium manganate separation device 30.

Optionally, the lye is preheated to 250° C. or higher and then introduced into the reaction chamber 12 through the lye inlet 1113. The manganese ore powder is added to the reaction chamber 12 by using the automatic screw feeder 13. The oxygen-rich reactant gas at a temperature of 250° C. or higher is introduced into the reaction tower body 11 through the second reactant gas inlet 1132, and into the gas flow channel 142 through the first reactant gas inlet 1123. The liquid phase in the reaction chamber 12 is controlled at a temperature between 250 and 270° C. A three-phase reaction is carried out in the reaction chamber 12 to produce potassium manganate. Manganese dioxide can exhibit a high percent conversion of 99.2%.

The reaction tower 10, the production system, and the production method for producing potassium manganate according to the embodiments of the present disclosure include the following advantageous effects.

(1) Manganese dioxide in manganese ore powder can exhibit a percent conversion of 99.2%.

(2) Potassium manganate can be produced at a faster reaction rate.

The above description is merely illustrative of some embodiments of the present disclosure and is not intended to limit the present disclosure. It will be understood by those skilled in the art that various modifications and variations may be made to the present disclosure. Any modifications, equivalent alternatives, improvements and so on made within the spirit and principle of the present disclosure are intended to be encompassed within the scope of protection of the present disclosure.

What is claimed is:

1. A reaction tower for producing potassium manganate, comprising:

a reaction tower body, wherein the reaction tower body has a reaction chamber therein; and at least one bubble generator, wherein the at least one bubble generator comprises an outer housing, wherein the outer housing is disposed in the reaction chamber, the outer housing has a gas flow channel therein, the outer housing is configured to direct an external reactant gas into the gas flow channel, and the outer housing is provided with a plurality of first pores each having a diameter less than 10 mm, and the gas flow channel communicates with the reaction chamber through the first pores.

2. The reaction tower according to claim 1, wherein a plurality of bubble generators are provided, and the plurality of bubble generators are disposed in the reaction chamber at intervals from top to bottom.

3. The reaction tower according to claim 2, wherein a plurality of first reactant gas inlets are disposed in a side wall of the reaction tower body from top to bottom, and each of the first reactant gas inlets is connected to the outer housing of one of the bubble generators and communicates with corresponding gas flow channel.

4. The reaction tower according to claim 2, further comprising at least one circulation pipe, wherein the at least one circulation pipe is vertically disposed in the reaction chamber, and the at least one circulation pipe has a first channel having both ends communicating with the reaction chamber.

5. The reaction tower according to claim 4, wherein the at least one circulation pipe is connected to the outer housing, the first channel is formed by an inner circumferential wall of the at least one circulation pipe, a gap is provided between an outer circumferential wall of the at least one circulation pipe and an inner wall of the reaction tower body, so as to form a second channel, and the first pores are configured to deliver the reactant gas from the gas flow channel to the second channel.

6. The reaction tower according to claim 5, wherein a plurality of circulation pipes are provided, and a gap is provided between two adjacent circulation pipes in the vertical direction.

7. The reaction tower according to claim 4, wherein the outer housing comprises a first housing and a first perforated plate, the gas flow channel is provided in the first housing, the at least one circulation pipe extends through the first housing, the first perforated plate is located outside the first housing, two ends of the first perforated plate are respectively connected to a circumferential wall of the first housing and a circumferential wall of the at least one circulation pipe, so that a first cavity is formed by an outer wall of the first housing, the circumferential wall of the at least one circulation pipe and the first perforated plate in combination, the first pores are provided in the first perforated plate, the first pores communicate with the first cavity, and the first housing is provided with a plurality of second pores, wherein the second pores communicate the gas flow channel and the first cavity.

8. The reaction tower according to claim 7, wherein each of the second pores has a diameter 5 to 20 times a diameter of each of the first pores.

9. The reaction tower according to claim 7, wherein the first pores in the first perforated plate and the second pores in the first housing are distributed evenly around a circumferential direction of the at least one circulation pipe.

10. The reaction tower according to claim 9, wherein the first perforated plate is located above the first housing, the first perforated plate has one end connected to an outer circumference of an upper surface of the first housing, and the plurality of second pores are evenly provided in the upper surface of the first housing.

11. The reaction tower according to claim 10, wherein a lower surface of the first housing is provided with a drain hole, the gas flow channel communicates with the reaction chamber through the drain hole.

12. The reaction tower according to claim 8, wherein the first perforated plate is recessed in a direction away from the first cavity; or the first perforated plate has an axial section in a shape of a straight plate.

13. The reaction tower according to claim 1, wherein a second reactant gas inlet is provided at a drain outlet of the reaction tower body, and the second reactant gas inlet communicates with the reaction chamber in the reaction tower body.

14. A system for producing potassium manganate, comprising a potassium manganate crystallization device, a potassium manganate separation device, and the reaction tower according to claim 1, wherein a drain outlet of the reaction tower body communicates with the potassium manganate crystallization device, and the potassium manganate separation device communicates with the potassium manganate crystallization device.

15. A method for producing potassium manganate, applicable to the system for producing potassium manganate according to claim 14, wherein the method comprises:

introducing a reactant gas into the gas flow channel through the outer housing and into the reaction chamber of the reaction tower body via the first pores, so that the reactant gas is converted into small bubbles, which are mixed and reacted with lye and manganese ore powder in the reaction chamber of the reaction tower body; and expelling reacted materials from the drain outlet to the potassium manganate crystallization device for crystallization, and then expelling resultant to the potassium manganate separation device for separation.

16. The reaction tower according to claim 5, wherein the outer housing comprises a first housing and a first perforated plate, the gas flow channel is provided in the first housing, the at least one circulation pipe extends through the first housing, the first perforated plate is located outside the first housing, two ends of the first perforated plate are respectively connected to a circumferential wall of the first housing and a circumferential wall of the at least one circulation pipe, so that a first cavity is formed by an outer wall of the first housing, the circumferential wall of the at least one circulation pipe and the first perforated plate in combination, the first pores are provided in the first perforated plate, the first pores communicate with the first cavity, and the first housing is provided with a plurality of second pores, wherein the second pores communicate the gas flow channel and the first cavity.

17. The reaction tower according to claim 6, wherein the outer housing comprises a first housing and a first perforated plate, the gas flow channel is provided in the first housing, the at least one circulation pipe extends through the first housing, the first perforated plate is located outside the first housing, two ends of the first perforated plate are respectively connected to a circumferential wall of the first housing and a circumferential wall of the at least one circulation pipe, so that a first cavity is formed by an outer wall of the first housing, the circumferential wall of the at least one circulation pipe and the first perforated plate in combination, the first pores are provided in the first perforated plate, the first pores communicate with the first cavity, and the first housing is provided with a plurality of second pores, wherein the second pores communicate the gas flow channel and the first cavity.

18. The reaction tower according to claim 9, wherein the first perforated plate is recessed in a direction away from the first cavity; or the first perforated plate has an axial section in a shape of a straight plate.

19. The reaction tower according to claim 10, wherein the first perforated plate is recessed in a direction away from the first cavity; or the first perforated plate has an axial section in a shape of a straight plate.

20. The reaction tower according to claim 11, wherein the first perforated plate is recessed in a direction away from the first cavity; or the first perforated plate has an axial section in a shape of a straight plate.

* * * * *